Patented Sept. 23, 1947

2,427,847

UNITED STATES PATENT OFFICE 2,427,847

PYROPHOSPHATES IN EMULSION POLYMERIZATION

Charles F. Fryling, Silver Lake, Ohio, assignor to The B. F. Goodrich Company, New York, N. Y., a corporation of New York No Drawing. Application April 6, 1940, Serial No. 328,380

12 Claims. (Cl. 260—84.5)

This method relates to an improved method of polymerization and specifically provides for the use of water soluble pyrophosphates in the emulsion polymerization of certain monomers or mixtures of monomers to yield elastic, vulcanizable polymers which may be called synthetic rubber.

The general method of preparing synthetic rubber-like materials by the emulsion polymerization of conjugated dienes or mixtures of conjugated dienes with other monomers is well known to the art and includes the essential steps of emulsifying the monomer or monomer mixture with a non-solvent, usually water, by the use of an agent to bring about emulsification, and then allowing the emulsified ingredients to polymerize.

I have now discovered that the emulsion polymerization of certain of these rubber-forming monomers or monomer mixtures is hastened and the quality of the products is greatly improved by including in the emulsion a water soluble pyrophosphate such as sodium pyrophosphate. This beneficial action of pyrophosphates occurs in those cases where the monomer or monomer mixture comprises a conjugated diene or a diene in admixture with one or more compounds capable of copolymerizing with dienes and which contains no unsaturated bonds except double bonds. This class of monomers and monomer mixtures which polymerize to form a rubber-like material includes, therefore, such conjugated dienes as butadiene, dimethyl butadiene, isoprene, chloroprene and the like either alone, in admixture with one another or in admixture with one or more other compounds which copolymerize with conjugated dienes to form a rubber-like material and which contain no unsaturated bonds except double bonds, these other compounds including, for examples, esters of acrylic acid such as methyl, ethyl, propyl or butyl acrylate, esters of alpha alkyl acrylic acids such as methyl, ethyl, propyl or butyl methacrylate, aryl olefins such as styrene or vinyl naphthalene, vinyl ketones, olefin dicarboxylic acids or their esters, esters containing two or more carbon to carbon double bonds which are not conjugated such as diallyl or divinyl esters of dibasic acids, vinylidene chloride, and other compounds of the nature hereinabove described. This class does not include, however, any monomer mixture containing compounds copolymerizable with dienes but which contain triple bonds such as the acrylic nitriles, since it has been found that the polymerization of diene nitrile systems is not improved by pyrophosphate.

In addition to the monomers and the pyrophosphate such other substances as are necessary or desired may also be present in the emulsion to be polymerized. For example, it is known that an emulsifying agent is necessary and the effect of pyrophosphate upon the polymerization may be observed while using any of the various emulsifying agents among which are: fatty acid soaps such as sodium oleate or sodium myristate; hymolal sulfates or sulfonates such as sodium lauryl sulfate or sodium dodecyl sulfonate; aromatic sulfonic acids or sulfonates such as sodium isobutyl naphthalene sulfonate; salts of high molecular weight organic bases such as the hydrochloride of diethylaminoethyloleylamide and other substances having emulsifying properties. If preferred other substances such as protective colloids or proteoids like egg albumin or blood serum may be used in maintaining the emulsion without destroying the effect of the pyrophosphate.

The presence of a catalyst for the polymerization is also desirable and the use of many catalysts in diene emulsions has been disclosed by the prior art. Among these are the peroxygen catalysts such as hydrogen peroxide, organic peroxides, persulfates, perborates, percarbonates and the like. By this invention it has been found that the catalytic action of these materials, and especially hydrogen peroxide, is greatly increased by the presence of the water soluble pyrophosphate. The use of pyrophosphate is not confined, however, to any particular catalyst or class of catalysts since the action of other catalysts which dissolve in the oil phase of the emulsion, as contrasted to the water phase, such as diazoaminobenzene, is also enhanced by its presence. Moreover, the presence of pyrophosphate brings about an increase in the rate of polymerization of systems to which no catalyst has been added but which may contain peroxide catalysts formed by the action of atmospheric oxygen on the unsaturated monomers.

Other substances which exert some modifying action during the polymerization or which improve the quality of the products may also be present, if desired, the essential feature in this invention being the presence of the water soluble pyrophosphate.

The factors influencing the polymerization of diene systems in emulsion are necessarily quite complex and this complexity increases as more variables are introduced by adding more materials to the emulsion. It is not altogether possible, therefore, to explain the manner in which pyrophosphates bring about improvements in polymerization. Since polymerization reactions are believed to be chain reactions initiated by some catalytic action, it seems probable that the action of the pyrophosphate is closely related to the action of the catalyst. It may be that the pyrophosphate reacts with or activates the catalyst in some way which increases the ability of the catalyst to initiate polymerization reactions. This activation may arise through the formation of a loosely combined addition compound of the catalyst and the pyrophosphate. The fact that pyrophosphates are known to form crystalline addition compounds with hydrogen peroxide supports this view. Since pyrophosphates also activate catalysts which are soluble in the oil phase of the emulsion, it may be that another of their functions is in the removal of substances which act as polymerization inhibitors. The improvement in the quality of the polymers formed in the presence of pyrophosphate also suggests the possibility that pyrophosphates influence the manner in which polymerization takes place so that polymers of different structure are formed because of their presence. It is to be understood however that these attempted explanations of the function of pyrophosphates in emulsion polymerization do not in any way limit the invention to any proposed theory.

Regardless of the exact mechanism by which pyrophosphates influence the polymerization, the practical effects attending the use of these materials are apparent. In many cases polymerizations resulting only in low yields, long reaction times and inferior products have been transformed into smooth rapid polymerizations producing good rubber-like products. These beneficial effects as well as the conditions and the method of carrying out this invention may best be appreciated by the inspection of comparative experimental results.

In order to show the differences obtained with the use of a pyrophosphate activated catalyst as compared to previously known catalysts, a series of experiments was performed in which various catalysts were used with the following emulsion:

Butadiene _____ g__ 6.0
Methyl methacrylate _____ g__ 4.0
Emulsifying agent—2% aqueous solution of
  a mixture of fatty acid soaps _____ c. c__ 25
Temperature _____ ° C__ 50

The various catalysts used were:

A. Diazoamino benzene
B. Potassium persulfate
C. Tertiary butyl hydroperoxide
D. Sodium pyrophosphate + hydrogen peroxide (added as $Na_4P_2O_7 \cdot 2H_2O_2$)

The emulsified comonomer samples were sealed in glass tubes and then agitated for various periods of time. The reaction was followed by measuring the fall of the meniscus in the tubes brought about by the increase in density resulting from polymerization. Complete reaction corresponds to a lowering of the meniscus of approximately 12 m. m. The value recorded in the table below under the heading "Extent Reaction" is the total drop over the period of time listed. The "induction period" is the time required before any falling of the meniscus is noted. The results of these experiments together with the tensile strength and elongation of the polymers prepared in each instance are listed in Table I:

TABLE I

| | A | B | C | D |
|---|---|---|---|---|
| Catalyst | diazoamino benzene | potassium persulfate | t-butyl hydroperoxide | $Na_4P_2O_7 \cdot 2H_2O_2$ |
| Weight of catalyst | 0.100 g | 0.100 g | 0.100 g | 0.100 g. |
| Extent reaction | 12 mm | 11 mm | 10 mm | 12 mm. |
| Time | 105 hr | 105 hr | 249 hr | 47 hr. |
| Induction period | 17 hr | 17 hr | 36 hr | 1 hr. |
| Yield | 98% | 95% | 99% | 100%. |
| Description Polymer | soft, stringy | soft, sticky | sticky | excellent. |
| Tensile strength | 1,700 lbs./sq. in | 2,600 lbs./sq. in | 2,100 lbs./sq. in | 4,600 lbs./sq. in. |
| Elongation | 650% | 550% | 300% | 660%. |

It is evident that the use of the sodium pyrophosphate activated hydrogen peroxide catalyst makes possible the attainment of a high rate of polymerization and produces a synthetic rubber exhibiting good milling behavior and excellent physical properties. Very similar results have been obtained on larger quantities of reacting materials and in stainless steel as well as glass containers. The same comparison also is shown when using lower temperatures for reaction, namely 30° C. and when using other emulsifying agents.

As in the above experiments, the pyrophosphate may be added in the form of the crystalline addition compound of sodium pyrophosphate with hydrogen peroxide, $Na_4P_2O_7 \cdot 2H_2O_2$. It is also possible to add the pyrophosphate in any other convenient form such as the decahydrate of sodium pyrophosphate, $Na_4P_2O_7 \cdot 10H_2O$, or the hydrate of potassium pyrophosphate $$K_4P_2O_7 \cdot 3H_2O$$

Calcium pyrophosphate, $Ca_2P_2O_7 \cdot 5H_2O$, and magnesium pyrophosphate, $Mg_2P_2O_7 \cdot 3H_2O$, are also slightly soluble in water and are operative in the present invention when used with compatible emulsifying agents.

The amount of pyrophosphate to be added depends upon the particular form in which it is applied and may be varied considerably. However, it is preferred to add from 0.5 to 2% by weight (based on the total weight of monomers present) if the peroxide addition compound is used and in other instances to employ amounts ranging from .5 to 5% by weight of the monomers. The desired proportion corresponds to a slight excess of pyrophosphate over the amount required to form the addition compound $$Na_4P_2O_7 \cdot 2H_2O_2$$

The variation of pyrophosphate concentration and its effect upon the yields and time of reaction is shown in Table II. The monomer mixture used was one of butadiene and methyl methacrylate, the total weight of these monomers being 10 grams. The emulsifying agent was a 2% aqueous solution of palmitic acid 85% neutralized with sodium hydroxide. The temperature used was 30° C.

TABLE II

A.—$Na_4P_2O_7 \cdot 2H_2O_2$

| Wt. of $Na_4P_2O_7 \cdot 2H_2O_2$ | Percent by weight (based on monomers) | Yield | Time | Induction period |
|---|---|---|---|---|
| | Per cent | Per cent | Hours | Hours |
| .013 g | .13 | 57 | 264 | 105 |
| .025 | .25 | 63 | 105 | 15 |
| .050 | .50 | 100 | 105 | 6 |
| .075 | .75 | 99 | 55 | 5½ |
| .100 | 1 | 96 | 55 | 4 |
| .200 | 2 | 100 | 55 | 4 |

B.—$Na_4P_2O_7 \cdot 10H_2O$ (.02 g. of $H_2O_2$ as catalyst)

| Wt. of $Na_4P_2O_7 \cdot 10H_2O$ | Percent by weight | Yield | Time | Induction period |
|---|---|---|---|---|
| None | None | Small | 19 days | 14 days. |
| 0.05 | 0.5 | 100% | 104 hours | 18 hours. |
| 0.10 | 1 | 98% | 56 hours | Ca. 6½ hours. |
| 0.20 | 2 | 98% | 56 hours | Ca. 6½ hours. |
| 0.30 | 3 | 97% | 56 hours | Ca. 6½ hours. |
| 0.40 | 4 | 97% | 56 hours | Ca. 6½ hours. |
| 0.50 | 5 | 98% | 56 hours | Ca. 6½ hours. |

Other embodiments of this invention include the use of pyrophosphate with a number of emulsifying agents. With all the emulsifying agents shown in Table III improved yields were obtained in a shorter time than without the pyrophosphate. The emulsifying agents were used in the following test recipe.

| | | |
|---|---|---|
| Butadiene | g | 6.0 |
| Methyl methacrylate | g | 4.0 |
| Hydrogen peroxide | g | 0.021 |
| Sod. pyrophosphate decahydrate | g | 0.30 |
| Emulsifying agent (2% aqueous) | cc | 25 |
| Temperature | °C | 30 |

TABLE III

| Emulsifying agent | Yield | Time | Tensile | Elongation |
|---|---|---|---|---|
| | Per cent | Hours | | |
| Sod. palmitate | 98 | 55 | 3,150 | 630 |
| "Ivory" soap chips | 97 | 104 | 3,250 | 710 |
| Sodium dodecyl sulfonate | 100 | 75 | 3,100 | 530 |
| Sodium lauryl sulfate | 100 | 55 | 4,650 | 540 |

Table IV presents a number of the different diene systems in which pyrophosphate has been found to be exceptionally useful. In many of these systems it is not possible to obtain a rubber-like product without pyrophosphate unless abnormally long reaction times are allowed for the polymerization to take place. With all the systems listed, it was possible to produce rubber-like polymers of improved physical properties in shorter reaction times and with lower temperatures by the addition of pyrophosphate. The monomer mixture in each case consisted of 60% by weight of butadiene and 40% by weight of the other monomer, (except in the example using dimethyl butadiene alone); the emulsifying agent was a 2% aqueous solution of 90% neutralized palmitic acid; and the catalyst was hydrogen peroxide activated by sodium pyrophosphate. The temperature used was 30° C.

TABLE IV

| Monomers | Yield | Time |
|---|---|---|
| | Per cent | Hours |
| Butadiene—methyl methacrylate | 98 | 80 |
| Butadiene—n-propyl methacrylate | 100 | 96 |
| Butadiene—n-butyl methacrylate | 99 | 96 |
| Butadiene—iso butyl methacrylate | 100 | 96 |
| Butadiene—methyl acrylate | 85 | 121 |
| Butadiene—butyl acrylate | 92 | 96 |
| Butadiene—styrene | 91 | 56 |
| Butadiene—vinyl naphthalene | 98 | 56 |
| Butadiene—dimethyl butadiene | 90 | 105 |
| Dimethyl butadiene (alone) | 93 | 105 |

As has been hereinabove mentioned, pyrophosphates exert an activating action when used with any of the catalysts known to promote polymerization of diene systems to rubber-like products. In Table V the results obtained with a number of catalysts are presented. It is to be observed that a marked effect is produced by the addition of pyrophosphate with both water soluble catalysts and oil soluble catalysts. Moreover, a good polymer is obtained without any catalyst when pyrophosphate is present. The improvement in physical properties is also especially to be noted. The data in Table V was obtained using a butadiene methyl methacrylate mixture emulsified with an aqueous solution of sodium palmitate as the emulsifier.

TABLE V

| Catalyst (.5% based on monomers) | $Na_4P_2O_7 \cdot 10H_2O$ (3% based on monomers) | Yield | Time | Temp. | Tens. | Elong. |
|---|---|---|---|---|---|---|
| | | Per cent | Hours | °C. | | |
| Hydrogen peroxide | absent | 91 | 167 | 40 | 3,300 | 750 |
| | present | 97 | 56 | 30 | 4,500 | 720 |
| Potassium Persulfate | absent | 69 | 246 | 40 | 2,000 | 820 |
| | present | 100 | 48 | 30 | 4,750 | 680 |
| Diazoamino benzene | absent | 88 | 120 | 40 | 1,600 | 600 |
| | present | 96 | 120 | 40 | 3,750 | 720 |
| Tert-butyl hydroperoxide | absent | 52 | 414 | 40 | 1,300 | 840 |
| | present | 94 | 120 | 40 | 4,150 | 720 |
| No catalyst | absent | No polymerization after 200 hrs. at 60° C. | | | | |
| | present | 96 | 66 | 60 | 4,300 | 520 |

Another advantage to be gained by the use of a pyrophosphate in the emulsion undergoing polymerization is that the inhibiting effect of certain foreign substances is substantially reduced by its presence. For example, small concentrations of copper salts exert a deleterious effect on polymerizations carried out in the presence of soap and hydrogen peroxide. The addition of pyrophosphate to this system, however, allows polymerization to proceed and mitigates the inhibitive effect of the copper salt.

From the foregoing disclosure and experimental results, it is obvious that many distinct advantages in polymerizations which yield synthetic rubber-like materials are presented by the practice of this invention. Moreover, many modifications and variations as to monomer mixtures, emulsifying agents, catalysts and conditions will be apparent to those skilled in the art. It is not intended therefore, that the invention be limited to details but rather that it be construed as broadly as possible in view of the prior art and in accordance with the appended claims.

I claim:

1. The process which comprises polymerizing a monomeric material polymerizable to form a rubber-like material and selected from the class consisting of open-chain aliphatic conjugated dienes alone and mixtures of an open-chain aliphatic conjugated diene with an unsaturated copolymerizable compound selected from the class consisting of aryl olefins and alkyl esters of acrylic and methacrylic acids, in aqueous emulsion in the presence of a water-soluble alkali metal pyrophosphate.

2. The process which comprises polymerizing a monomeric material polymerizable to form a rubber-like material and selected from the class consisting of open-chain aliphatic conjugated dienes alone and mixtures of an open-chain aliphatic conjugated diene with an unsaturated copolymerizable compound selected from the class consisting of aryl olefins and alkyl esters of acrylic and methacrylic acids, in aqueous emulsion in the presence of hydrogen peroxide and a water-soluble alkali metal pyrophosphate.

3. The process which comprises polymerizing a monomeric material polymerizable to form a rubber-like material and selected from the class consisting of open-chain aliphatic conjugated dienes alone and mixtures of an open-chain aliphatic conjugated diene with an unsaturated copolymerizable compound selected from the class consisting of aryl olefins and alkyl esters of acrylic and methacrylic acids, in aqueous emulsion in the presence of soap, hydrogen peroxide and a water-soluble alkali metal pyrophosphate.

4. The process which comprises polymerizing a monomeric material polymerizable to form a rubber-like material and consisting of a mixture of butadiene-1,3 and methyl methacrylate, in aqueous emulsion in the presence of sodium pyrophosphate.

5. The process which comprises polymerizing a monomeric material polymerizable to form a rubber-like material and consisting of a mixture of butadiene-1,3 and methyl methacrylate, in aqueous emulsion in the presence of soap, hydrogen peroxide and sodium pyrophosphate.

6. The process which comprises polymerizing a monomeric material polymerizable to form a rubber-like material and consisting of a mixture of butadiene-1,3 and an alkyl ester of acrylic acid, in aqueous emulsion in the presence of sodium pyrophosphate.

7. The process which comprises polymerizing a monomeric material polymerizable to form a rubber-like material and consisting of a mixture of butadiene-1,3 and an aryl olefin, in aqueous emulsion in the presence of sodium pyrophosphate.

8. The process which comprises polymerizing a monomeric material polymerizable to form a rubber-like material and consisting of a mixture of butadiene-1,3 and styrene, in aqueous emulsion in the presence of sodium pyrophosphate.

9. A rubber-like product of improved quality resulting from the polymerization of a monomeric material polymerizable to form a rubber-like material and selected from the class consisting of open-chain aliphatic conjugated dienes alone and mixtures of an open-chain aliphatic conjugated diene with an unsaturated copolymerizable compound selected from the class consisting of aryl olefins and alkyl esters of acrylic and methacrylic acids, said polymerization being carried out in aqueous emulsion in the presence of a water-soluble alkali metal pyrophosphate.

10. A rubber-like product of improved quality resulting from the polymerization of a monomeric material polymerizable to form a rubber-like material nd consisting of a mixture of butadiene-1,3 and methyl methacrylate, said polymerization being carried out in aqueous emulsion in the presence of a water-soluble alkali metal pyrophosphate.

11. A rubber-like product of improved quality resulting from the polymerization of a monomeric material polymerizable to form a rubber-like material and consisting of a mixture of butadiene-1,3 and methyl acrylate, said polymerization being carried out in aqueous emulsion in the presence of a water-soluble alkali metal pyrophosphate.

12. A rubber-like product of improved quality resulting from the polymerization of a monomeric material polymerizable to form a rubber-like material and consisting of a mixture of butadiene-1,3 and styrene, said polymerization being carried out in aqueous emulsion in the presence of a water-soluble alkali metal pyrophosphate.

CHARLES F. FRYLING.

REFERENCES CITED

The following references are of record in the file of this patent:

UNITED STATES PATENTS

| Number | Name | Date |
|---|---|---|
| 2,118,946 | Reppe et al. | May 31, 1938 |
| 2,179,040 | Heuer | Nov. 7, 1939 |
| 2,194,416 | Bock | Mar. 19, 1940 |
| 2,218,362 | Starkweather et al. | Oct. 15, 1940 |
| 2,300,056 | Meis et al. | Oct. 27, 1942 |

FOREIGN PATENTS

| Number | Country | Date |
|---|---|---|
| 401,653 | Great Britain | Oct. 30, 1933 |

OTHER REFERENCES

Burk et al., "Polymerization," published by Reinhold Pub. Corp., New York, 1937, page 29.

Certificate of Correction

Patent No. 2,427,847.

September 23, 1947.

CHARLES F. FRYLING

It is hereby certified that errors appear in the printed specification of the above numbered patent requiring correction as follows: Column 1, line 1, for the word "method", first occurrence, read *invention*; column 6, line 69, for "perioxide" read *peroxide*; column 8, line 24, claim 10, for "nd" read *and*; and that the said Letters Patent should be read with these corrections therein that the same may conform to the record of the case in the Patent Office.

Signed and sealed this 15th day of June, A. D. 1948.

[SEAL]

THOMAS F. MURPHY,
*Assistant Commissioner of Patents.*